Patented Apr. 5, 1927.

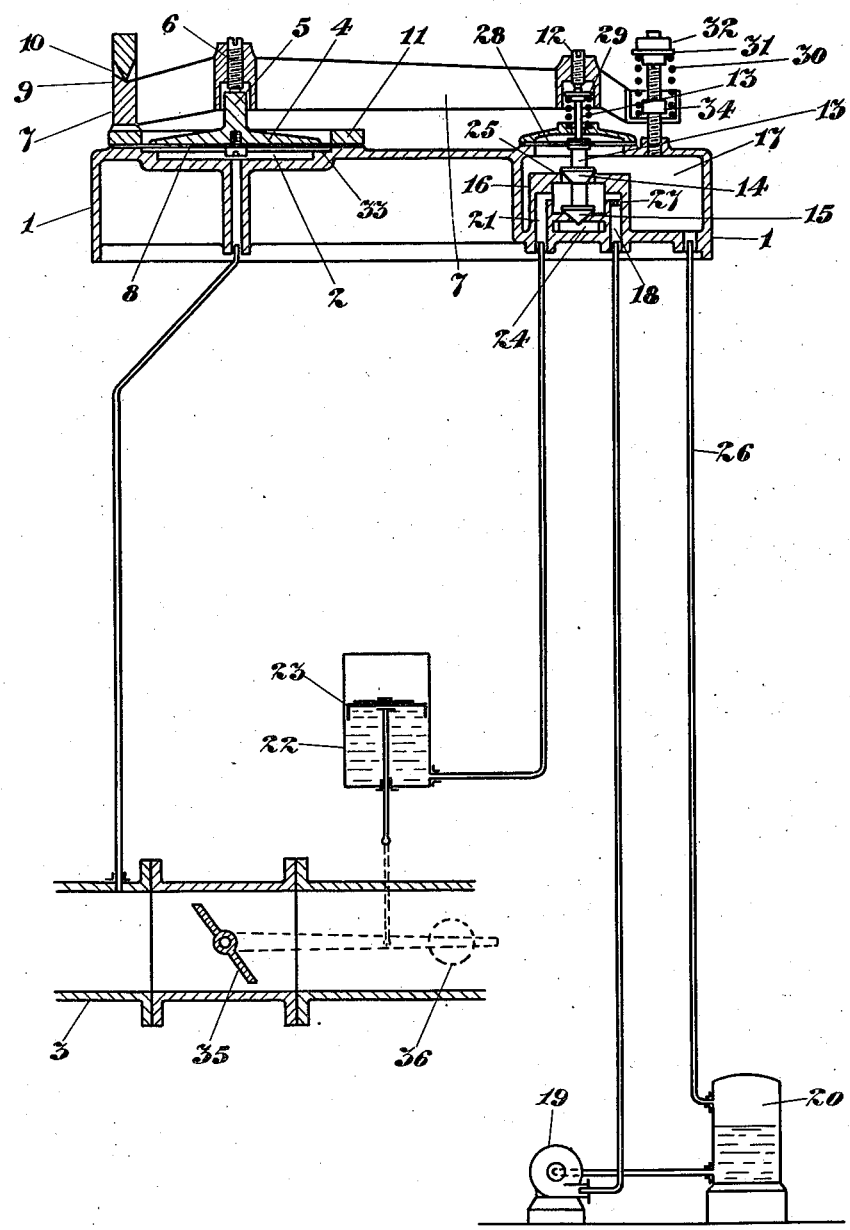

1,623,444

UNITED STATES PATENT OFFICE.

ARVID MARTIN SJÖÖ, OF STOCKHOLM, SWEDEN.

AUTOMATIC REGULATOR.

Application filed June 13, 1923, Serial No. 645,218, and in Sweden July 4, 1922.

My invention relates to improvements in automatic relays for operating a regulating device by means of a fluid under pressure, in which a special organ, being directly influenced by the fluid or force, which is to be regulated, causes the relay to operate in a certain desired manner.

My invention is especially and broadly characterized by this, that the impulse receiving organ is mechanically connected with a balanced reducing pressure valve, arranged in the structural body of the relay so as to cause the fluid, which may be a gas or a liquid, which is being used as means for operating the automatic regulators, to flow under a certain pressure towards the balanced valve of the regulator. This pressure is to closely correspond with the movements of the organ, which is being influenced by a change in the conditions of pressure, heat, density and so forth in the fluid or force, which is to be automatically controlled in one or more respects.

The relay may be used in connection with a plurality of different kinds of regulating devices as for instance for controlling the steam pressure in the boilerhouse of a powerplant, the gas pressure in the mains coming from a gasworks, the hydraulic pressure of water or any other liquid, the depth of the liquid contents in a reservoir the strength or voltage of an electric current, or for any analogous purpose.

Any kind of a fluid, having a certain pressure, such as a gas, a vapor, steam, water, oil, glycerine or any other liquid may be used as motive power for operating the balanced valve and the mechanism, which acts directly upon the liquid or gaseous body, which is being controlled.

The automatic relay is according to my invention provided with a well balanced reducing pressure valve, the purpose of which is to control the auxiliary power. This valve is directly or indirectly connected with the impulse receiving organ, which according to the character of the regulator consists of a plunger, being operated by a fluid under pressure, and electric solenoid, a thermostat or the like.

A relay for automatic control of the pressure of a gas, flowing in a pipe and built according to the present invention, is illustrated on the accompanying drawing, which shows a diagram containing all the essential parts required for automatically controlling the pressure in the pipe on one side of the valve indicated on the drawing.

The frame body 1 of the relay contains a chamber 2, which is subject to a certain pressure. The gas pressure in the pipe 3, which is to be regulated so as to keep constant within certain limits, acts upon a plunger 4, which by means of a stud 5 on one side is pressing against a screw 6 in the lever 7. The plunger 4 is separated from the pressure chamber 2 by means of an elastic membrane or disc 8, the central part of which is secured to the plunger, which in this manner is being supported and guided during its reciprocating movements.

The lever 7 is at one end provided with a cupbearing 9, having a knifeedge 10 attached to a ring 11, which is pressed gastight against the framework 1. The other end of said lever has a screw 12, which is caused to press against the top of the stem 13 of the valve of the relay. The pressure from the lever is by means of the stem transmitted to the cones 14 and 15 in the housing 16 of the valve.

This housing is located in the lower part of a chamber 17 in the frame body of the relay and is provided with four separate ports for the controlling liquid. Said ports consist of a channel 18 for admitting the high-pressure liquid, supplied for instance by a centrifugal pump 19, connected to a high-pressure reservoir 20, another channel 21 for admitting the liquid to the hydraulic cylinder 22 underneath a plunger 23, and, furthermore, the openings 24 and 25, through which the liquid may escape to the chamber 17 and thence through a pipe 26 to the reservoir 20.

The channel 18 is provided with a contraction 27 for controlling the maximum amount of flow of the regulating fluid.

The movable part of the valve is supported and guided by a membrane 28. A pressure spring 29 serves to keep the spindle of the valve always pressed against the lever 7, thus causing it to closely follow the oscillating movements of said lever. The pressure acting upon the plunger 4 is balanced by the action of a spring 30, which is kept in place and controlled by means of a washer 31 and a nut 32.

The stroke of the plunger, i. e. the movement of the lever, is limited in one direction by means of a ring-shaped surface 33 underneath the edge of the plunger and in the other direction by means of a nut 34 secured to the stud, which carries the spring-adjusting nut 32.

The mode of operation of the regulating mechanism described above is as follows:

For a certain amount of the pressure in the gas pipe 3 the plunger 4 will remain stationary as this certain amount of pressure of the gas is counterbalanced by the pressure of the spring 30, as stated above. If the gas pressure is changed, the plunger will at once move in a certain direction, causing the lever to move accordingly. The valve of the regulator will open or close the outlets in the housing of the valve, depending upon which way the lever acts upon the stem of the valve and, consequently, the plunger 23 in the cylinder 22 will be caused to move in a certain direction.

If, for instance, the gas pressure on the left side of the valve 35 in the gas pipe 3 rises above its normal value, the valve of the regulator will at once open the outlets in the housing, permitting the fluid supplied by the centrifugal pump (or from high pressure watermains, if such are available) to flow more or less freely through the contraction 27 into the housing and back to the reservoir.

The pressure in the cylinder 22 will then decrease, causing a counterweight 36 to move downwards closing the valve 35 more or less, until the gas pressure has again decreased to normal value. If, on the other hand, the gas pressure decreases, the mode of operation will be quite opposite. The valve of the regulator will then close, increasing the pressure underneath the plunger in the cylinder 22 and causing it to lift the counterweight thereby opening the gas valve so as to raise the pressure on the left side.

The results of closely balancing the valve of the relay are, that variations in the pressure of the auxiliary power do not affect the relay during the operation. Such variations are very detrimental to the efficiency of a valve, which is subject to a one-sided pressure only.

By employing a balanced valve it becomes possible to make the valve of the relay of more liberal size than would be possible without impairing the regulation in a regulator having only a one-seated valve. It is clear, that by employing a valve of fairly large size impurities in the fluid, which acts as regulating means, will get less chance to cause irregularities in the operation of the mechanism by preventing the fluid from flowing freely through the channels and pipes.

It has been assumed above that the regulator has acted upon the pressure reducing valve in the main pipe line in such a manner that when the pressure increases the valve is to close or vice versa. It is, however, under certain conditions desirable that the regulator operates in a directly opposite way. The relay may for this purpose be provided with one more lever together with supports for same.

My invention it not limited to only the arrangement illustrated on the drawing, but may be employed in many modified ways.

The relay may, furthermore, be used for other purposes than described above. It is for instance possible to replace the plunger of the impulse receiving organ with a solenoid, a thermostatic device or the like depending on what purpose the automatic regulator is intended for.

Having now fully described my invention, I claim and desire to secure by Letters Patent of the United States:

1. An automatic regulating device, comprising a relay member, a balanced outlet valve having a casing and controlled by the relay member, a regulating member, a fluid motor connected with and actuating the regulating member, a source of fluid pressure, pipe connections between the source of fluid pressure, the balanced outlet valve and the fluid motor, said pipe connections continuously maintaining an open communication through the balanced valve casing between the fluid motor and the source of fluid pressure, the balanced outlet valve operating to vary the pressure in the valve casing under the action of the relay member without changing the communication between the source of fluid pressure and the fluid motor and simultaneously varying the pressure in the pipe connection to the motor whereby the fluid motor operates the regulating member through the action of said relay member.

2. An automatic regulating device, comprising a relay member, a balanced outlet valve having a casing and controlled by the relay member, a regulating valve, a fluid motor connected with and actuating the regulating valve, a source of fluid pressure, pipe connections between the source of fluid pressure, the balanced outlet valve and the fluid motor, said pipe connections continuously maintaining an open communication through the balanced valve between the fluid motor and the source of fluid pressure, the balanced outlet valve operating to vary the pressure in the valve casing under the action of the relay member without changing the communication between the source of fluid pressure and the fluid motor and simultaneously varying the pressure in the pipe connection to the motor whereby the fluid motor operates the regulating valve through the action of said relay member.

3. In an automatic regulating device, the combination of a relay member, a regulating member, a fluid motor connected with and actuating the regulating member, a balanced two-seated outlet valve having a casing and means for causing a fluid to flow through the outlet valve casing to the fluid motor, said means always maintaining an open communication through the balanced valve casing to the fluid motor, the balanced valve operating to reduce the pressure within its casing and thereby control the pressure transmitted to the fluid motor for operating the regulating member.

4. In an automatic regulating device, the combination of a relay member operated by a fluid and subjected to the pressure to be controlled and having a plunger actuated by such pressure, said plunger being provided with a projecting stud, a lever engaged by the stud, a screw mounted on the lever and engaging the stud for adjusting the former, a two-seated balanced outlet valve operated by the lever, adjustable means for maintaining the valve in contact with the lever, a housing for the balanced valve having an inlet and a plurality of outlets and means for circulating an auxiliary fluid through the housing to the motor, the pressure of the auxiliary fluid transmitted to the motor being carried by the balanced valve.

5. In an automatic regulating device, the combination of a relay provided with a plunger subjected to the pressure to be regulated, a lever actuated by the plunger, a two-seated balanced reducing valve having a casing, a regulating valve and a fluid motor for actuating the regulating valve, said fluid motor communicating with the casing of the balanced reducing valve and with a source of fluid pressure and having a uniform area of communication with the said source of fluid pressure in each position of the said reducing valve, the latter operating to control the pressure transmitted to the fluid motor.

Signed at Stockholm in the county of Stockholms Län and State of Sweden this 28th day of May, A. D. 1923.

ARVID MARTIN SJÖÖ.